US009176652B1

(12) United States Patent
Patel et al.

(10) Patent No.: US 9,176,652 B1
(45) Date of Patent: Nov. 3, 2015

(54) METHOD AND SYSTEM FOR DYNAMICALLY DEFINING SCROLL-WHEEL FUNCTIONALITY ON A TOUCHPAD

(75) Inventors: Nirmal J. Patel, Mountain View, CA (US); Thad E. Starner, Mountain View, CA (US)

(73) Assignee: Google Inc., Mountain View, CA (US)

( * ) Notice: Subject to any disclaimer, the term of this patent is extended or adjusted under 35 U.S.C. 154(b) by 781 days.

(21) Appl. No.: 13/187,131

(22) Filed: Jul. 20, 2011

(51) Int. Cl.
*G09F 5/00* (2006.01)
*G06F 3/0484* (2013.01)

(52) U.S. Cl.
CPC .................. *G06F 3/04845* (2013.01)

(58) Field of Classification Search
CPC ............ G06F 3/04845; G06F 3/04812
USPC ........................................... 345/676
See application file for complete search history.

(56) References Cited

U.S. PATENT DOCUMENTS

| 7,564,449 | B2 * | 7/2009 | Layton et al. | 345/173 |
|---|---|---|---|---|
| 8,310,456 | B2 * | 11/2012 | Kim et al. | 345/173 |
| 2003/0156144 | A1 * | 8/2003 | Morita | 345/848 |
| 2006/0026535 | A1 | 2/2006 | Hotelling et al. | |
| 2009/0058800 | A1 * | 3/2009 | Ishigaki et al. | 345/156 |
| 2009/0303187 | A1 * | 12/2009 | Pallakoff | 345/169 |
| 2010/0220037 | A1 * | 9/2010 | Sako et al. | 345/8 |
| 2011/0025618 | A1 * | 2/2011 | Cottarel et al. | 345/173 |
| 2011/0205175 | A1 * | 8/2011 | Chen | 345/173 |
| 2013/0009853 | A1 * | 1/2013 | Hesselink et al. | 345/8 |

OTHER PUBLICATIONS

M. A. Nacenta, P. Baudisch, H. Benko, and A. Wilson. Separability of Spatial Manipulations in Multi-Touch Interfaces. In Proc. Graphics Interface, pp. 175-182, Toronto, 2009. CIPS.*
Hurst, Chapter 20: Video Browsing on Handheld Devices, Handbook of Multimedia for Digital Entertainment and Arts, 2009, Part 3, pp. 447-469, 2009.
Moscovich et al., Navigating Documents with the Virtual Scroll Ring, Proceedings of the 17th annual ACM symposium on User interface software and technology, vol. 6, Issue 2, pp. 57-60, Oct. 24, 2004.
Smith et al., The radial scroll tool: scrolling support for stylus—or touch-based document navigation, Proceedings of the 17th annual ACM symposium on User interface software and technology, vol. 6, Issue 2, pp. 53-56, Oct. 24, 2004.

* cited by examiner

*Primary Examiner* — Devona Faulk
*Assistant Examiner* — Jin Ge
(74) *Attorney, Agent, or Firm* — McDonnell Boehnen Hulbert & Berghoff LLP

(57) ABSTRACT

A method is provided for providing scroll-wheel functionality on a touchpad without the touchpad predefining a scroll-wheel. The method includes receiving data corresponding to progressive movement of a touch point on the touchpad, determining from the received data that the progressive movement is substantially elliptical, defining an ellipse around an ellipse center. The method further includes detecting, based on the determined movement, continued angular movement of the touch point around the ellipse center, and registering the continued angular movement as one or more scroll events in the computing system.

26 Claims, 8 Drawing Sheets

METHOD AND SYSTEM FOR DYNAMICALLY DEFINING SCROLL-WHEEL FUNCTIONALITY ON A TOUCHPAD

BACKGROUND

Unless otherwise indicated herein, the materials described in this section are not prior art to the claims in this application and are not admitted to be prior art by inclusion in this section.

In computer graphics or displays, scrolling involves a process of moving a cursor through text or other items on display, as well as a process of sliding text or images across a monitor or display. Scrolling is typically done on a computing device by a central processing unit or a graphics card. In a window, icon, menu, and pointing device (WIMP) style graphical user interface, scrolling is done with the help of a scrollbar or using keyboard shortcuts, often the arrow keys. Scrolling is often a key feature in text user interfaces and command line interfaces, though older computer terminals used Up and Down keys or the space bar.

Computer mice may also have a scroll wheel, which moves a cursor, text or images vertically when rolled. Some recent computer mice have scroll balls or tilt wheels which allow for horizontal scrolling of the cursor and of text or images.

Users of electronic documents currently have additional choices in the way of scrolling and navigating through electronic documents. For instance, there are scrolling programs that use a preset graphical user interface (GUI) virtual scrollbar along the side of the displayed documents for navigation purposes.

In the above discussed cases, scrolling can only be performed by the use of scrolling devices or by the guidance of displayed scrolling material. Therefore, it would be advantageous to provide computing devices, coupled to or equipped with touch recognizing devices, with a scrolling functionality that is not subject to these limitations.

SUMMARY

Disclosed herein are improved methods, systems, and devices for dynamically defining scroll-wheel functionality on a touchpad of a computing system or device.

In one embodiment, a method is provided for providing scroll-wheel functionality on a touchpad without the touchpad predefining a scroll-wheel. The method includes receiving data corresponding to progressive movement of a touch point on the touchpad, determining from the received data that the progressive movement is substantially elliptical, defining an ellipse around an ellipse center. The method further includes detecting, based on the determined movement, continued angular movement of the touch point around the ellipse center, and registering the continued angular movement as one or more scroll events in the computing system.

In another embodiment, a computing system includes a display device configured to display graphical images, a touch pad positioned on the display device, and configured to generate a signal indicative of a progressive movement of a touch point on the touchpad, a memory unit storing program instructions directed to the method for providing scroll-wheel functionality on a touchpad without the touchpad predefining a scroll-wheel, and a processor unit operatively coupled to the memory unit, the touchpad, and the display device, and configured to execute the method.

In another embodiment, a non-transitory computer readable storage medium contains instructions that cause a computing system to perform the method for providing scroll-wheel functionality on a touchpad without the touchpad predefining a scroll-wheel.

In yet another embodiment, a head-wearable display device includes a display element for displaying graphical images, an image projecting unit for projecting the graphical images on the display element, a touch pad configured to generate a signal indicative of a progressive movement of a touch point on the touchpad, a memory unit storing program instructions directed to a method for providing scroll-wheel functionality on the touchpad without the touchpad predefining a scroll-wheel, and a processor operatively coupled to the memory, the touchpad, and the image projecting unit, and configured to execute the method.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The methods, systems, and apparatuses or devices disclosed herein generally relate to providing scroll-wheel functionality on a touchpad or touchscreen without the touchpad predefining a scroll-wheel. The method is directed to providing dynamic scroll-wheel functionality on the touchpad or touchscreen without having a pre-set circle (or, more generally, an ellipse) on the touchpad to define the scroll-wheel. As a general matter, the system is configured to detect that a user has dragged in a substantially elliptical motion at any place on the touchpad, and then tracking continued dragging around the ellipse center as user scrolling input. The system further recognizes that as the user continues to drag around the ellipse, the ellipse may shift position or size; therefore, while receiving the user's scrolling input, the system may recalibrate the position and size of the ellipse to facilitate continued tracking of the scrolling motion.

Figure 1:
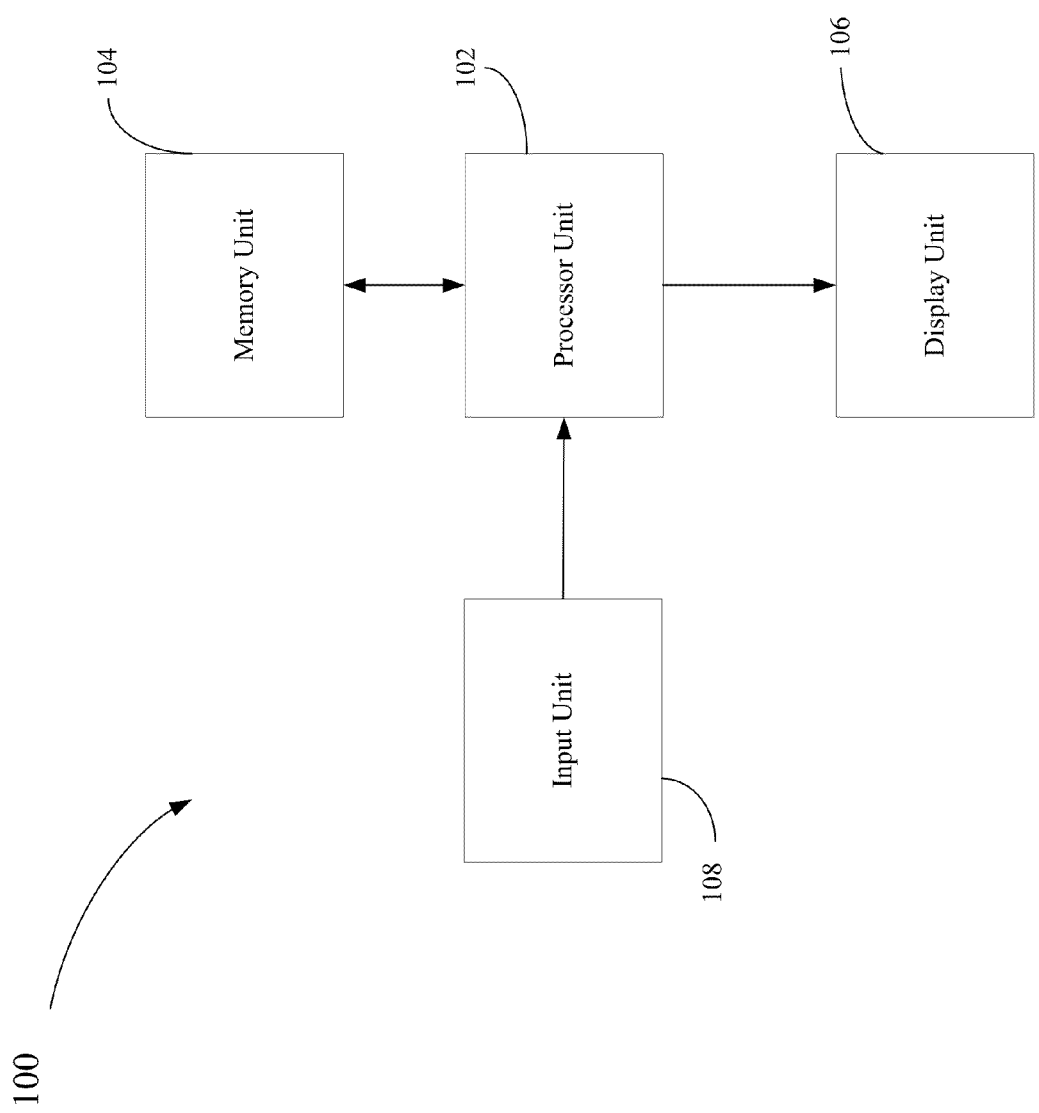
FIG. 1 is a block diagram illustrating an embodiment of a computing system.

Referring to FIG. 1, a block diagram illustrates an exemplary computing system 100 used for performing a method for providing scroll-wheel functionality on a touchpad without the touchpad predefining a scroll-wheel. Computing system 100 may correspond to a portion of a small-form factor portable (or mobile) electronic device such as a cell phone, a personal data assistant (PDA), a personal media player device, a personal headset device, or a hybrid device that includes any of the above functions. The computing system can also be implemented as a personal computer, which may include a laptop computer configuration or a non-laptop computer configuration, a notebook computer, or tablet computer. As shown, the computing system includes a processor unit 102, a memory unit 104, a display unit 106, and an input unit 108.

Processor unit 102 is configured to execute instructions and to carry out operations associated with computing system 100. For example, using instructions retrieved from memory unit 104, the processor unit may control the reception and manipulation of input and output data between components of computing system 100. The processor unit can be implemented on a single-chip, multiple chips or multiple electrical components. For example, various architectures can be used for processor unit 102, including dedicated or embedded processor, single purpose processor, controller, application-specific integrated circuit (ASIC), and so forth. In most cases, the processor unit together with an operating system operates to execute computer code and produce and use data. Memory unit 104 generally provides a place to store computer code and data that are used by computing system 100.

Memory unit 104 generally provides a place to store computer code and data that are used by computing system 100. The memory unit may include read-only memory (ROM), random-access memory (RAM), a hard disk drive and/or the like. Additional functions and characteristics of the memory unit will be discussed in detail hereafter below.

Display unit 106, operatively coupled to processor unit 102 may be a liquid crystal display (LCD) (e.g., active matrix, passive matrix and the like), a light-emitting diode (LED) display, a plasma display, a display implemented with electronic inks, or any other desirable display. Additionally, the display unit may include input configurations of input unit 108, which can display a GUI (not shown) that can provide an easy to use interface between a user of computing system 100 and the operating system or an application running thereon.

Input unit 108, operatively coupled to processor unit 102, may for example be used to make selections with respect to the GUI on display unit 106. The input unit may also be used to issue commands to processor unit 102. The input unit may include a touch sensing element, which is configured to receive input from a user's touch and to send this input to processor unit 102. Alternatively, the input unit may include a proximity sensing element, which is configured to receive input when the user's finger is within a predetermined distance from a surface of the proximity sensing element and to send this input to processor unit 102. For the sake of simplicity, hereafter input unit 108 will be considered to include a touch sensing element. The touch sensing element may be a touchpad or a touch screen, each of which may be configured to recognize touch points, in terms of coordinates of their positions as well as their magnitudes on a corresponding touch sensitive surface. The input unit is configured to report data corresponding to the touch points to processor unit 102, which interprets them in accordance with a corresponding programming. For example, the processor unit may initiate a task in accordance with a particular touch. The touch sensing element may be based on sensing technologies including but not limited to capacitive sensing, resistive sensing, surface acoustic wave sensing, pressure sensing, optical sensing, and/or the like. Additionally, the touch sensing element may be configured to detect a single touch point or a plurality of simultaneous touch points.

The input unit 108 may be a touch screen that is integrated with display unit 106. As such, the input unit may be positioned in front, behind, or within a display element of the display unit. When integrated with the display unit, the input unit enables the user to manipulate the GUI directly. For example, the user can simply touch with his/her finger or a stylus a location on the touch screen corresponding to a displayed text or image to be controlled or manipulated. As a touchpad, the input unit is placed away from display unit in a different location. The touchpad typically provides a sensing surface for sliding a finger or a stylus the same way one would use a mouse to scroll a text or an image or to generate a scrolling gesture or motion. Moreover, the touchpad sensing surface can be tapped instead of pressing a button of the mouse.

During operation, information is input into computing system 100 by the user's finger or stylus touching the touch sensing element of input unit 108. Information concerning the location of the user's finger or stylus on the input unit is communicated to the processor unit. In practice, this information may comprise the Cartesian (i.e., x & y) coordinates of the corresponding touch point on the input unit on which the user's finger or stylus is positioned. The processor unit then processes the information via a corresponding application program stored in the memory unit. The processor unit may then produce data that is output to the display unit to produce appropriate texts or images on its screen.

Computing system 100 may include additional input/output (I/O) devices or units (not shown). By way of example, the additional I/O devices may correspond to keyboards, printers, scanners, cameras, speakers, and/or the like. The additional I/O devices may be integrated with the computing system or may be separate components (e.g., peripheral devices) coupled to the computing system through wired connections (e.g., cables and ports) or through wireless connections (e.g., infrared (IR), radio frequency (RF), Bluetooth or the like).

In accordance with an embodiment of the method for dynamically defining a scroll-wheel functionality, at startup of computing system 100 or after a predetermined period involving no scrolling activity by the user, the computing system is configured to be in a non-scroll wheel state, and no scrolling functionality is predefined by input unit 108. The non-scroll wheel state corresponds to a state in which the computing system provides no predefined area of input unit that defines a scroll wheel. In other words, the input unit is not configured to provide an area where any detected touch point movement, such as finger sliding, is automatically interpreted by computing system to trigger a scrolling event.

Further in accordance with the example embodiment, the computing system 100 will then transition to a scroll wheel state upon programmatically detecting a substantially elliptical motion of a touch point on the input unit. In particular, the computing system will programmatically detect that the touch point on the input unit progresses in a substantially elliptical motion and will responsively transition to provide scroll-wheel functionality, in which the computing system will treat continued elliptical movement of the touch point as triggering scrolling events.

Figure 2:
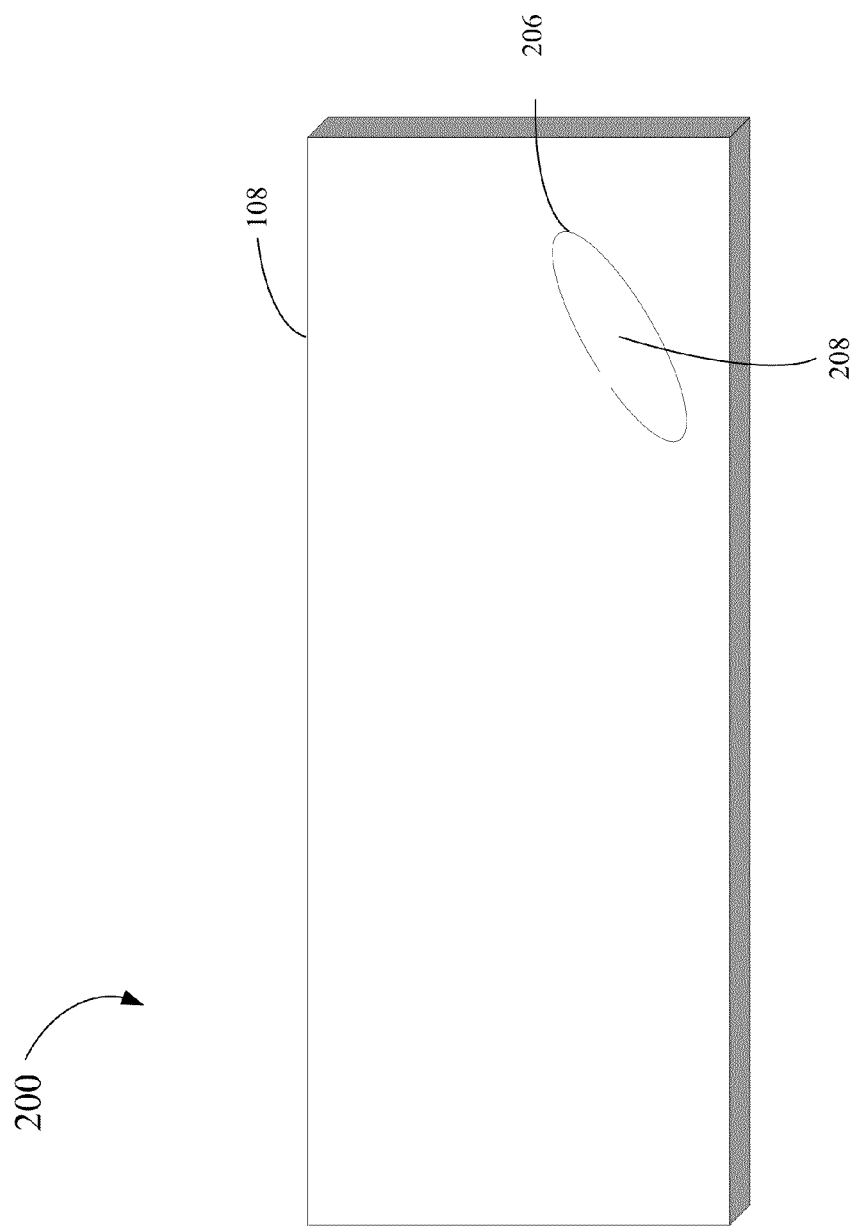
FIG. 2 illustrates an exemplary embodiment of an input unit on which a user's finger or stylus is dragged in a substantially circular or elliptical motion to trigger a scroll wheel mode.

FIG. 2 shows an embodiment of input unit 108 on which the user has dragged his finger or stylus in a substantially elliptical motion 206 to trigger a state transition of the computing system from the non-scroll-wheel state to the scroll-wheel state. For the sake of simplicity, the discussion will be hereafter directed to the user using his/her finger, rather than a stylus, to make contact with the input unit. As stated above, the computing system is configured to recognize touch points applied to the input unit and to control aspects of the computing system based on the locations of the touch points and their progressive movements as sensed by the input unit, and the input unit communicates the locations of the touch points in terms of their x and y coordinates to the processor unit. In response to the detection of the user's finger motion on the input unit, as communicated to the processor unit by the input unit, the processor unit is configured to determine whether a sequence of touch points associated with the detected motion defines a substantially elliptical motion, thereby causing the computing system to transition to the scroll-wheel state.

Figure 3:
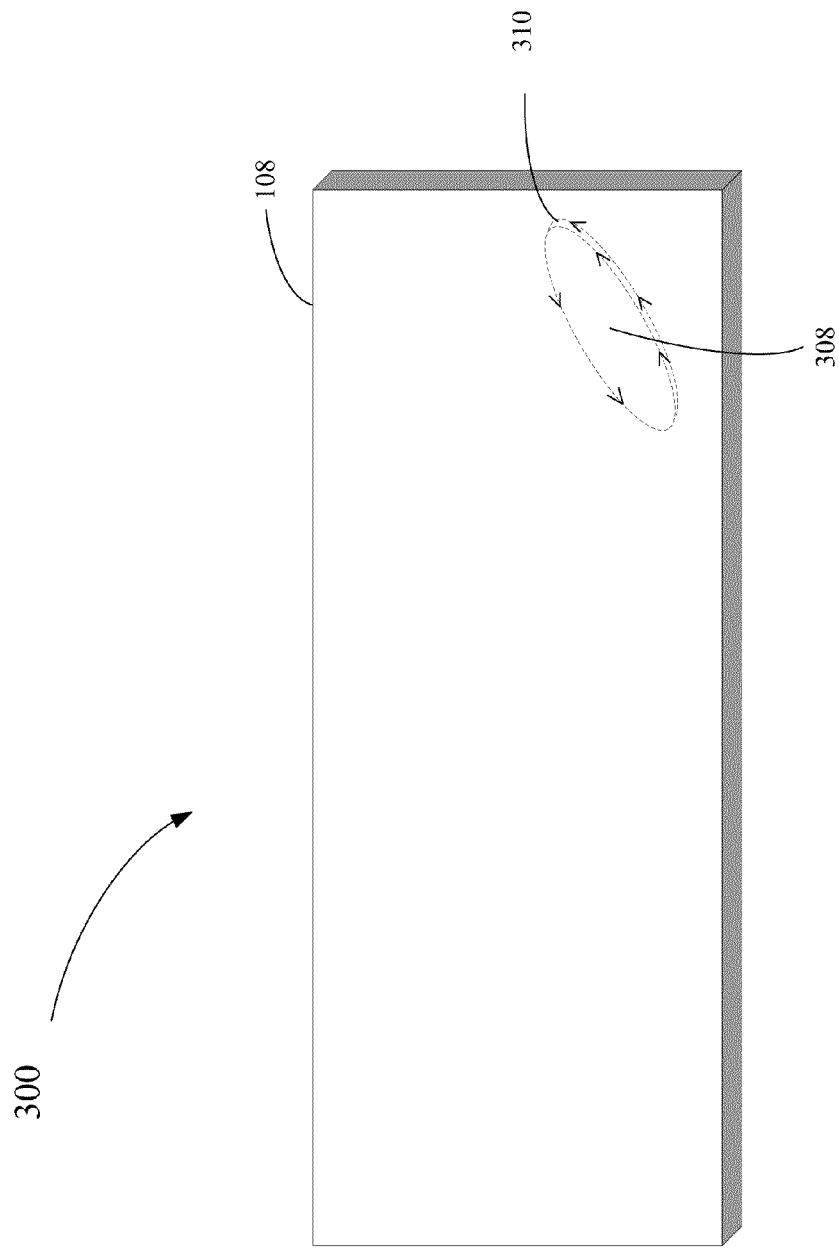
FIG. 3 illustrates the input unit of FIG. 2 on which the user continues to drag his finger in angular movements around a center of the substantially elliptical motion of FIG. 2.
Figure 4:
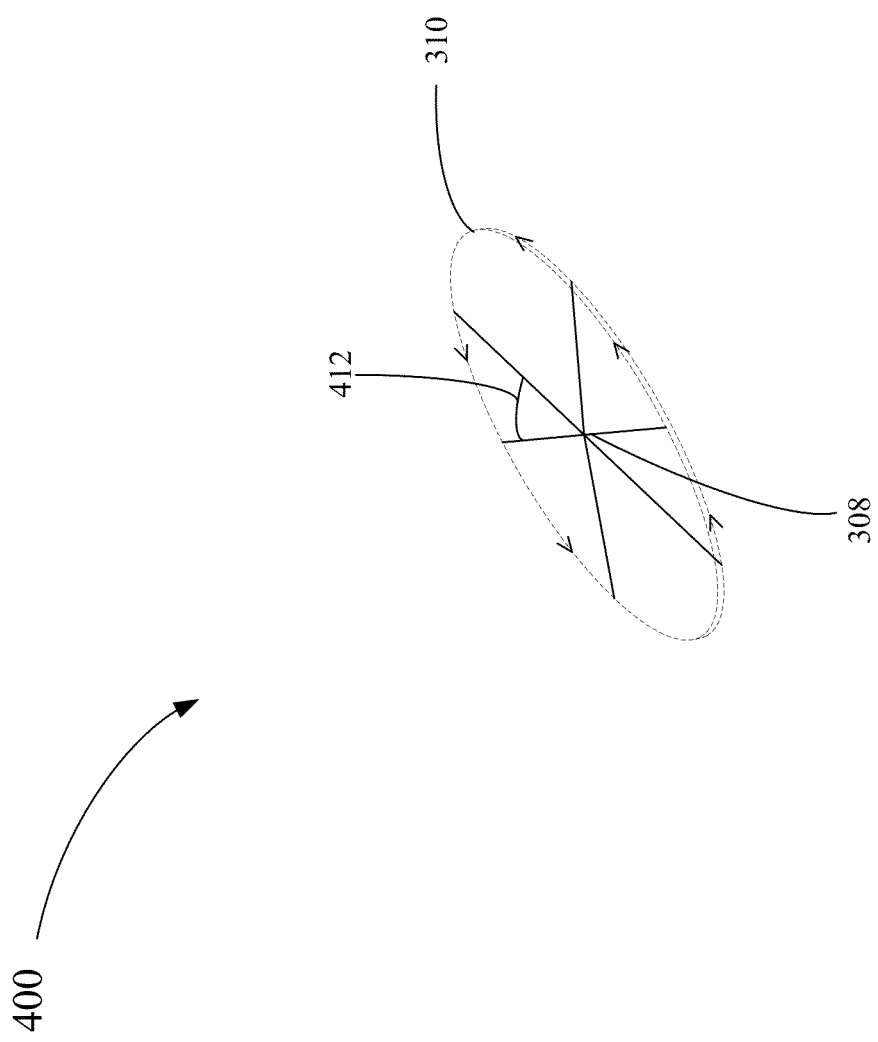
FIG. 4 illustrates an embodiment of the continued angular movements of FIG. 3 subdivided into a plurality of angular thresholds.

Once in the scroll-wheel state, the computing system is configured to detect continued dragging or angular movement of the touch point around a center of the substantially elliptical motion, and to trigger one or more scrolling events upon such detection. FIG. 3 shows an embodiment of input unit 108 on which the user has continued dragging his or her finger in an angular movement 310 around a center 308 of detected substantially elliptical motion 206 in order to trigger one or more scrolling events. A scrolling event represents a process of moving a cursor through text or other items on display, as well as a process of sliding text or images across display unit 106. In accordance with the method, a scrolling event is triggered each time angular movement 310 around center 308 is determined by processor unit 102 to be greater than or equal to an angular threshold. FIG. 4 illustrates continued angular movement 310, subdivided into a plurality of angular thresholds 412, each of which may trigger a corresponding scrolling event.

Figure 5:
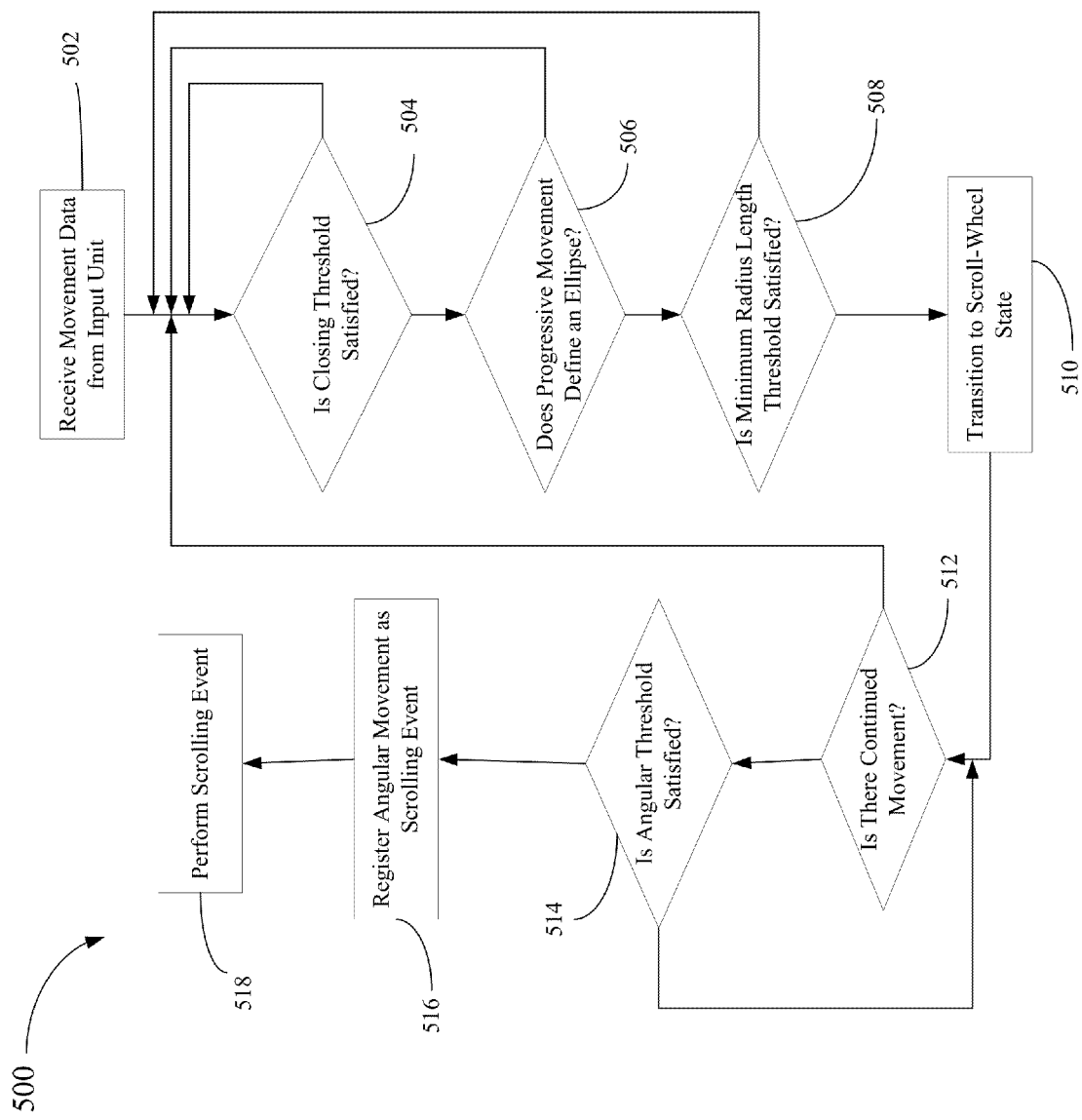
FIG. 5 is a flow diagram illustrating an exemplary method for providing scroll-wheel functionality on a touch pad.

FIG. 5 is a flow diagram 500 that illustrates a process for determining that the motion detected by input unit 108 defines substantially elliptical motion 206, and for determining that continued angular movement 310 around center 208 of substantially elliptical motion 206 is greater than or equal to angular threshold 412, thereby triggering a scrolling event.

As shown in FIG. 5, blocks 502 through 508 correspond to the determination that the detected motion by input unit 108 defines substantially elliptical motion 206. At block 502, input unit 108 senses and communicates to processor unit 102 touch point data generated by the user touching or dragging his/her finger on input unit 108. The touch point data is communicated as a set of coordinates that represents a progressive movement or motion 206 of the touch point of the user's finger on the input unit. Based on the communicated touch point data, the processor unit is configured to determine whether progressive motion 206 defines a substantially elliptical pattern of touch points on the input unit, i.e., whether the user has dragged his/her finger in a substantially elliptical motion, at block 506.

In practice, for instance, the processor unit may perform the elliptical motion determination by evaluating the sequence of touch point coordinates representing the movement of the user's finger on the input unit. In particular, the processor unit may store in 104 the sequence of touch point locations (coordinates), cooperatively defining a path of the touch point movement on the input unit. For each new touch point location in the sequence, at block 504, the processor unit may then compare the location with each past touch point location to determine if the new touch point location is within a "CLOSING_THRESHOLD" of the past touch point location, to justify a conclusion at block 506 that the touch point has moved in a sufficiently elliptical or at least approximately closed loop manner.

CLOSING_THRESHOLD is set to be a distance that would represent a sufficiently closed loop. For instance, the CLOSING_THRESHOLD could be zero, if the requirement would be that the touch point location must return precisely to a previous touch point location. Alternatively, to facilitate user dragging in an approximate ellipse without the need for the user to precisely drag back to a starting point of the ellipse, CLOSING_THRESHOLD could be set to a non-zero value that represents a desired tolerance.

Once the processor unit detects that a new touch point location is within the CLOSING_THRESHOLD of an earlier touch point location, a fair conclusion is that the user has dragged his or her finger in a substantially closed loop. At this point, the processor unit may then evaluate the subset of touch point locations extending from the earlier touch point location to the new touch point location, to determine whether the substantially closed loop motion is substantially elliptical (perhaps substantially circular), such that the processor unit should trigger a scroll-wheel mode.

In particular, the processor unit may geometrically evaluate the touch point locations of the subset to establish representative characteristics of the touch point motion, such as an ellipse center point, an ellipse radius (or multiple radii, such as a minor radius and a major radius), and an ellipse tilt angle, and the processor may determine whether one or more of those characteristics represents substantially elliptical motion.

For instance, the processor unit may compute the average x and y coordinates of the touch point locations in the subset and may treat that average as a center point. Further, the processor unit may compute the distance between the center point and each touch point location in the subset to establish for each touch point in the subset a respective radius value. The processor unit may then average those radius values to establish an average radius and may compute a standard deviation of the radius values. In turn, the processor may then determine if the average radius is greater than a MIN_RADIUS threshold value and the standard deviation is less than some defined threshold fraction (e.g., 0.25) of the average radius. If so, the processor unit may conclude that the touch point locations of the subset represent substantially elliptical motion, such that the processor unit should trigger a scroll wheel mode. Otherwise, the processor unit may conclude that the touch point locations do not represent a substantially elliptical motion, and the processor unit may discard the data.

Further or alternatively, the processor unit may curve fit an ellipse to the touch point location data, by determining an elliptical curve that offers the best possible fit to the touch point data. As known to one of ordinary skill in the art, curve fitting of an ellipse may be performed by any one of known curve fitting approaches. One such curve fitting approach is based on the technique of least square minimization, which involves minimizing the sum of the squared distances from a perimeter of the ellipse to the data points along a radial line extending from an ellipse center to each data point. Each of the curve fitting approaches serves to determine the center of the ellipse, the length of each one of the minor and major radii of the ellipse, and a tilt angle of the ellipse with respect to a set of X and Y axes.

The processor unit may then be configured to determine whether the length of the minor radius is greater than or equal to a predetermined MIN_RADIUS threshold, at block 508. If the processor unit thereby determines that the minor radius length is less than the MIN_RADIUS threshold, the determined ellipse is considered to be not eligible to trigger the scroll wheel mode, and the processor unit may discard the touch point data. On the other hand, if the processor unit determines that the minor radius length is equal to or greater than the threshold, then the processor unit may trigger the scroll wheel mode, and computing system may transition to a scroll-wheel state of operation, at block 510.

Once the computing system transitions to the scroll mode, the input unit provides scroll wheel functionality, so that as the processor unit detects that the touch point location continues to move in the substantially elliptical path, the processor unit will trigger scrolling events, i.e., the processor unit will translate the continued touch point motion into corresponding scrolling events.

In accordance with one embodiment of the method for dynamically defining a scroll-wheel functionality, even though the computing system triggers the scroll-wheel mode, upon transitioning to the scroll-wheel state of operation, the processor unit does not display a virtual scroll-wheel on display unit 106. Alternately, in accordance with another embodiment of the method, the processor unit may display a virtual scroll-wheel on the display unit 106, desirably in a semi-transparent form so as not to completely obstruct any displayed text and/or images.

Continuing with reference to FIG. 5, blocks 510 through 518 correspond to the determination that continued angular movement 310 around center 208 of substantially elliptical motion 206 is greater than or equal to angular threshold 412, thereby triggering a scrolling event. Upon transitioning to the scroll-wheel state of operation, the computing system is configured to continue monitoring movements of the user's touch points about the center of the determined ellipse. This continued movement monitoring is performed by the processor unit determining whether subsequent touch point data communicated by the input unit represents continued elliptical movement of the touch point around the ellipse center, at block 512. Upon determination of continued elliptical movement, the processor unit determines whether the continued elliptical movement defines an angular movement around the ellipse center, and whether the angular movement is greater than or equal to a predetermined angular threshold 412, thereby triggering a scrolling event, at block 514.

The predetermined angular threshold 412 may be any angular value that needs to be matched by the angular movement to trigger a scrolling event. In a particular embodiment, the angular threshold 412 may be equal to about 60 degrees. However, other angular threshold values are possible as well. Upon determination that the elliptical progressive movement traversed an angle at least equal to the predetermined angular threshold 412, the processor unit registers the corresponding angular movement as a scrolling event, at block 516, and proceeds substantially simultaneously, i.e. dynamically, to scroll a cursor or to scroll through texts or images on the display unit, at block 518. As such, to convert elliptical movements into scrolling events, the processor unit is configured to track the angular movement of the user's touch point on the input unit around the ellipse center, and to trigger a scrolling event each time the angular movement equals the angular threshold 412.

Moreover, while the input unit continues detecting continuous contact of the user's finger, the computing system remains in the scroll-wheel state of operation. However, once the input unit stops detecting contact of the user's finger, the scrolling mode is disengaged and the computing system switches back into the non-scrolling state of operation. Alternately, the scrolling mode may be disengaged only after the user's finger is lifted and remains off the input unit for at least a predetermined period of time, say for example a predetermined number of seconds.

In another embodiment of the method, the computing system can be configured to provide scrolling functionality that includes scrolling inertia, i.e., a scrolling event may continue even after the user's finger is lifted off the input unit immediately following an angular movement greater or equal to angular threshold 412 if a speed of the angular movement is greater than or equal a predetermined scrolling speed threshold, and may stop once the user's finger is placed back on the input unit.

Moreover, a direction of the scrolling event can be configurable. In one embodiment of the method, a clockwise movement on the input unit may be converted into a "down" scrolling event to traverse a list of items, or a "right" scrolling event to scroll texts with the cursor. In addition, a counter-clockwise movement may be converted into an "up" scrolling event or a "left" scrolling event.

Computing system 100 is further configured to account for the possibility that as the user continues to drag his/her finger on the input unit, the angular movements may drift away from an initially or latest determined ellipse. The angular movement drifting may include possible shifting and/or changing in size or other configuration of the ellipse. To account for such angular movement drifting, the computing system may from time to time automatically recalibrate the ellipse by determining its new characteristics, which reflect its possible shifting and/or size changing, while simultaneously continuing to recognize and convert the angular movements into scrolling events. The new characteristics of the recalibrated ellipse may include a new center, new major and minor radii, and a new tilt angle with respect to the X and Y axes. In practice, the recalibration of the determined ellipse may be performed every 360 degrees, at each scroll event, or at some other predetermined angular interval.

One possible reason for the drifting of the ellipse is that the user may wish to make smaller or larger elliptical movements as a way of controlling an overall angular movement speed, while maintaining a substantially constant finger speed along the perimeter of the ellipse. As such, the computing system is configured to determine whether the ellipse has become smaller or larger by evaluating changes in the lengths of the minor and major radii. With a substantially constant finger speed, a smaller ellipse allows the user to cover any desired angle faster, in which case the computing system may speed up the scrolling. Similarly, a larger ellipse may require longer times to cover any desired angle, and so the computing system may slow down the scrolling, thereby enabling the user a more granular scrolling control of texts or images.

In another embodiment of the method, the computing system may be configured to increase the scrolling speed upon determination that a distance between the ellipse center and the latest touch point locations is decreasing during the angular movement, regardless of the changing status of the user's finger speed. Similarly, the computing system may be configured to decrease the scrolling speed upon determination that a distance between the ellipse center and the latest touch point locations is increasing during the angular movement, regardless of the changing status of the user's finger speed.

In another embodiment of the method, angular threshold 412 can be changed to allow for faster or slower scrolling. As such, the computing system can be configured to track and measure angular velocity of the user's angular movements over time, so as the angular movements speed up, the computing system lowers the angular threshold 412 to increase the speed of the scrolling event. Similarly, as the angular movements slow down, the computing system increases the angular threshold to provide the user improved scrolling control.

The dynamic scroll-wheel functionality, discussed above, can be provided on any touch sensitive input unit 108, regardless of whether input unit 108 itself also functions as a display for presenting the results of scrolling (e.g., showing a cursor or highlighting through a series of user interface elements). In an implementation where input unit 108 is a touchpad provided on a touch-sensitive display (such as on a smart phone or notebook computer display screen for instance), the scroll wheel mode can be provided as the user drags in an elliptical motion over whatever content is presented on display unit 106. Advantageously, the computing system thereby allows the user to benefit from scroll-wheel scrolling functionality in many different situations, notwithstanding the absence of any predefined scroll-wheel circle. Also advantageously, the computing system helps avoid the need to provide arrow keys or the like (which could take up valuable keyboard space) or to have the user engage in repetitive pressing of such keys (which could be uncomfortable), as the computing system instead allows for scroll-wheel functionality.

Figure 6:
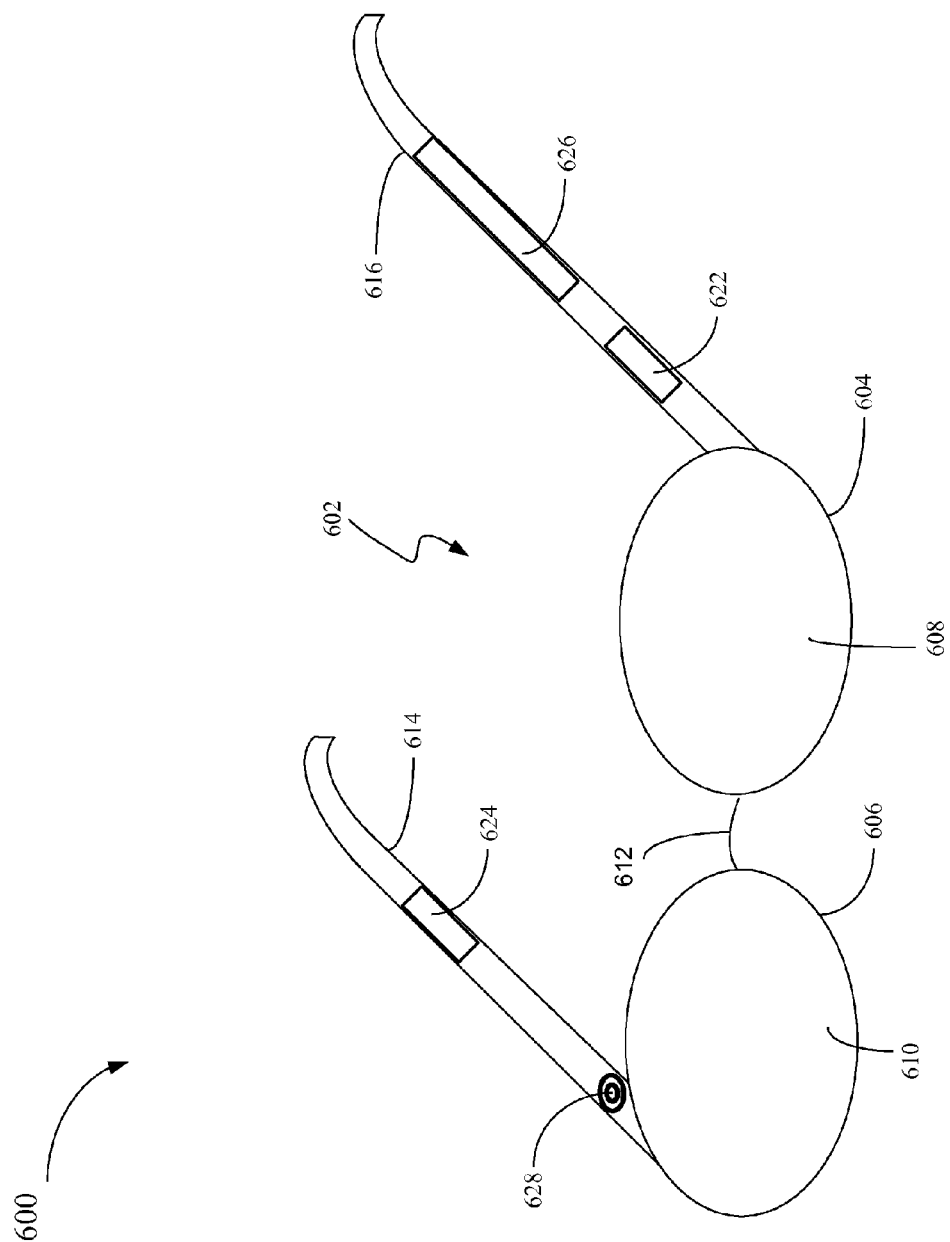
FIG. 6 illustrates an embodiment of a head-wearable display device with an integrated input device.

The above discussed method and system for providing scroll-wheel functionality may be implemented in various arrangements. One such arrangement may include a head wearable display device 600, as shown in FIG. 6. Head wearable display device 600, which is suitable for continuous, daily use as a wearable personal electronics device, includes a pair of glasses 602. While FIG. 600 illustrates glasses 602 as an example of head wearable display device 600, other types of head wearable display devices could additionally or alternatively be used. In addition, other non-head wearable electronic devices, such as a wrist watch, or other non-wearable electronic devices, such as a mobile phone or laptop computer could be used.

As illustrated in FIG. 6, glasses 602 comprise frame elements including lens frames 604, 606, respective lens elements or display units 608 and 610, a center frame support 612, two stems or temples 614 and 616, and planar direction input units 622, 624. The center support 612 and the two rearward extending stems 614 and 616 are configured to secure the glasses 602 to a user's face via a user's nose and ears, respectively. Each of the frame elements 604, 606, 612 and stems 614, 616 may be formed of a solid structure of plastic, metal, ceramic, etc., or may be formed of a hollow structure of similar material so as to allow wiring and component interconnects to be internally routed through glasses 602. Each of stems 614 and 616 is an example of a projection that extends away from a display element and is used to secure the display element to a user.

As shown in FIG. 6, glasses 602 further include a computing device 626 and a miniature projector unit 628 coupled to an inside-surface of stem 614 and configured to project a display onto an inside-surface of display unit 608. Computing device 626 includes a processor unit and a memory unit (not shown). In one embodiment, computing device 626 may be incorporated into glasses 602. In another embodiment, computing device 626 may be a head-mounted computing device incorporated into, for example, a hat or helmet, or may be a body-mounted computing device incorporated into, for example, a waist-mounted mobile phone or personal digital assistant. Computing device 626 is coupled to planar direction input units 622, 624 and to miniature projector unit 628.

As such, computing device 626 is configured to transmit input received from planar direction input devices 622, 624, and to transmit display data to miniature projector unit 628 for display on display unit 608. Additionally, glasses 602 may further include a movement sensor (not shown), and a microphone (not shown), among other possible input units.

During operation, the user may drag his finger on one of the planar direction input devices 622, 624 into a substantially elliptical (e.g., circular) motion to transition computing device 626 into a scroll wheel state. Subsequently, one of the planar direction input devices 622, 624 communicates any continued angular motion to computing device 626, thereby triggering a corresponding scrolling event.

Figure 7:
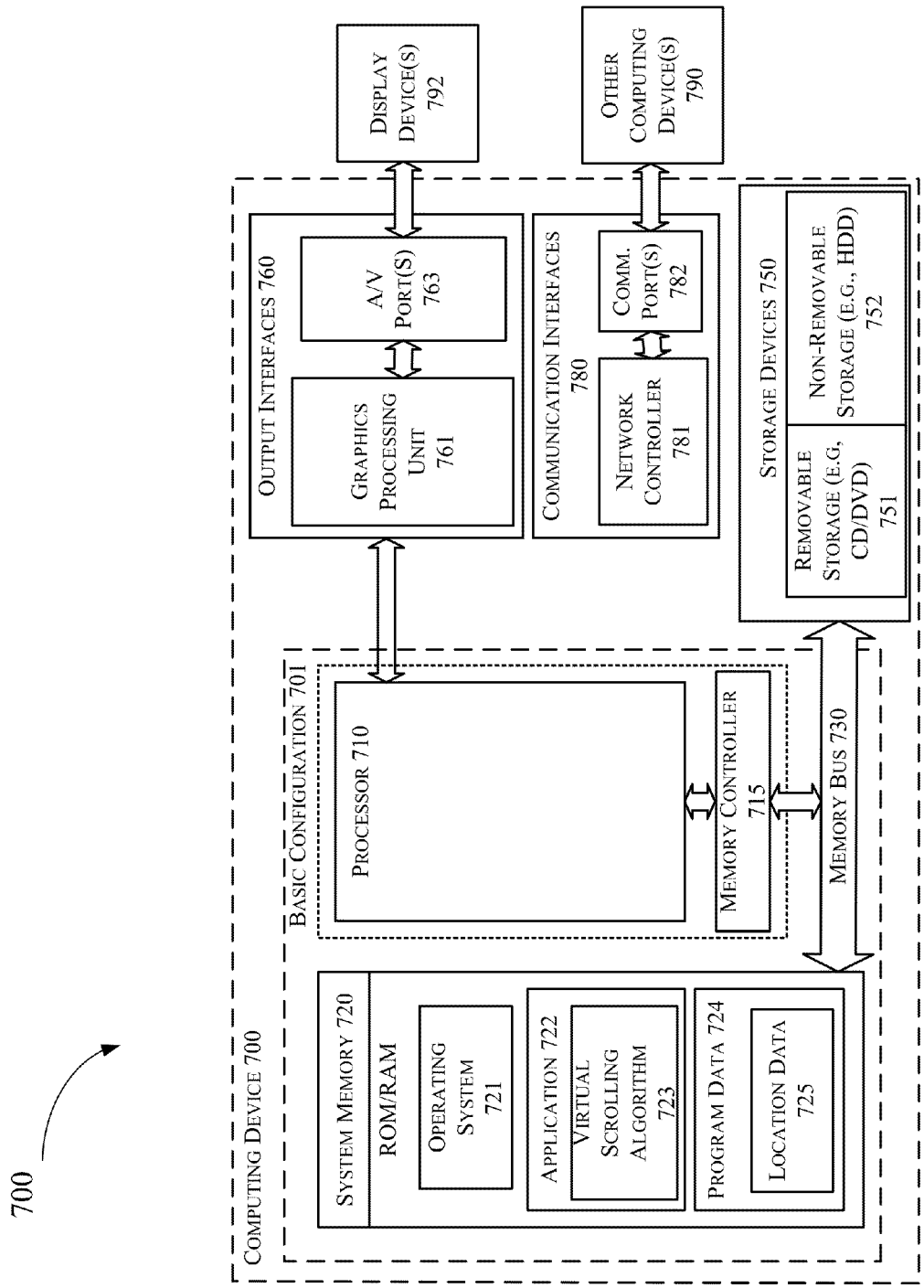
FIG. 7 is a functional block diagram illustrating an example computing device associated with the computing system of FIG. 1.

In accordance with an embodiment of the method for providing scroll-wheel functionality on input unit 108 without input unit 108 predefining a scroll-wheel, computing system 100 includes memory unit 104, which in turn includes a non-transitory computer readable storage medium, discussed hereafter with regard to FIG. 7 that contains instructions that cause computing system 100 to perform the method.

FIG. 7 is a functional block diagram illustrating an example computing device 700 used in a computing system 100 that is arranged in accordance with at least some embodiments described herein. The computing device may be a personal computer, mobile device, cellular phone, video game system, or global positioning system. In a rudimentary configuration 701, computing device 700 may include one or more processors 710 and system memory 720. A memory bus 730 can be used for communicating between the processor 710 and the system memory 720. Depending on the desired configuration, processor 710 can be of any type including but not limited to a microprocessor (µP), a microcontroller (µC), a digital signal processor (DSP), or any combination thereof. A memory controller 715 can also be used with the processor 710, or in some implementations, the memory controller 715 can be an internal part of the processor 710.

Depending on the desired configuration, the system memory 720 can be of any type including but not limited to volatile memory (such as RAM), non-volatile memory (such as ROM, flash memory, etc.) or any combination thereof. System memory 720 typically includes one or more applications 722, and program data 724. Application 722 may include a virtual scrolling algorithm 723 that is arranged to provide inputs to the electronic circuits, in accordance with the present disclosure. Program Data 724 may include location data 725 that could provide location data to the electronic circuits. In some example embodiments, application 722 can be arranged to operate with program data 724 on an operating system 721. This described basic configuration is illustrated in FIG. 7 by those components within dashed line 701. Operating systems are generally well known and will not be described in greater detail. By way of example, the operating system may correspond to OS/2, DOS, Unix, Linux, Palm OS, and the like. The operating system can also be a special purpose operating system, such as may be used for limited purpose appliance-type computing devices.

Computing device 700 can have additional features or functionality, and additional interfaces to facilitate communications between the basic configuration 701 and any devices and interfaces. For example, the data storage devices 750 can be removable storage devices 751, non-removable storage devices 752, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, removable and non-removable media implemented in any method or technology for storage of information, such as computer readable instructions, data structures, program modules, or other data.

System memory 720, removable storage 751, and non-removable storage 752 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media can be part of device 700.

Computing device 700 can also include output interfaces 760 that may include a graphics processing unit 761, which can be configured to communicate to various external devices such as display devices 792 or speakers via one or more A/V ports 763 or a communication interface 780. A communication interface 780 may include a network controller 781, which can be arranged to facilitate communications with one or more other computing devices 790 over a network communication via one or more communication ports 782. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 700 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 can also be implemented as a personal computer including both laptop computer and non-laptop computer configurations.

It should be further understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

Figure 8:
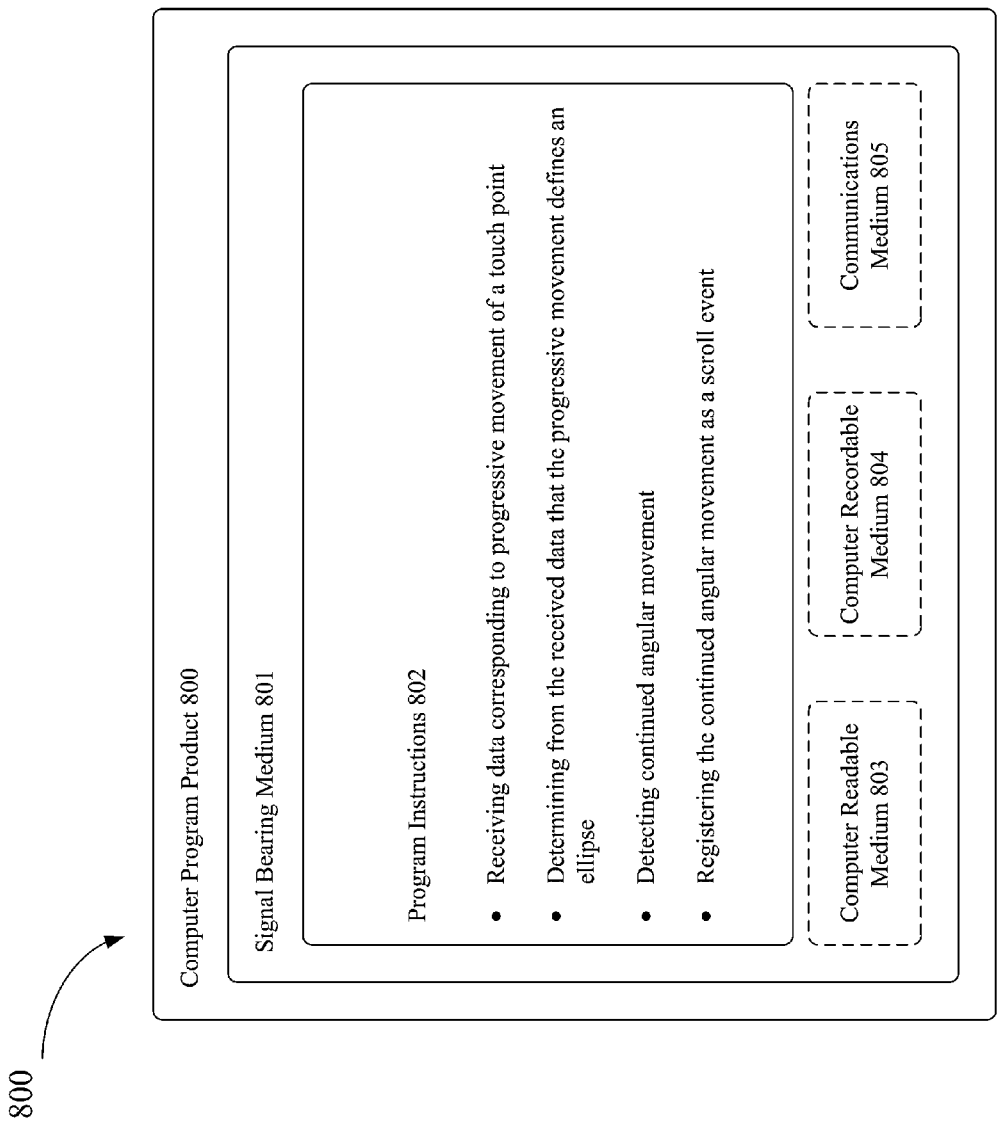
FIG. 8 is a schematic diagram illustrating a conceptual partial view of an example computer program associated with the method of FIG. 5.

In some embodiments, the disclosed methods may be implemented as computer program instructions encoded on a computer-readable storage media in a machine-readable format. FIG. 8 is a schematic illustrating a conceptual partial view of an example computer program product 800 that includes a computer program for executing a computer process on a computing device, arranged according to at least some embodiments presented herein. In one embodiment, the example computer program product 800 is provided using a signal bearing medium 801. The signal bearing medium 801 may include one or more programming instructions 802 that, when executed by one or more processors may provide functionality or portions of the functionality described above with respect to FIGS. 1-8. Thus, for example, referring the embodiment shown in FIG. 5, one or more features of blocks 502, 504, 506, 508, 510, 512, 514, 516 and/or 518 may be undertaken by one or more instructions associated with the signal bearing medium 801.

In some examples, the signal bearing medium 801 may encompass a non-transitory computer-readable medium 803, such as, but not limited to, a hard disk drive, a Compact Disc (CD), a Digital Video Disk (DVD), a digital tape, memory, etc. In some implementations, the signal bearing medium 801 may encompass a computer recordable medium 804, such as, but not limited to, memory, read/write (R/W) CDs, R/W DVDs, etc. In some implementations, the signal bearing medium 801 may encompass a communications medium 805, such as, but not limited to, a digital and/or an analog communication medium (e.g., a fiber optic cable, a waveguide, a wired communications link, a wireless communication link, etc.). Thus, for example, the signal bearing medium 801 may be conveyed by a wireless form of the communications medium 805 (e.g., a wireless communications medium conforming with the IEEE 802.11 standard or other transmission protocol).

The one or more programming instructions 802 may be, for example, computer executable and/or logic implemented instructions. In some examples, a computing device such as the computing device 700 of FIG. 7 may be configured to provide various operations, functions, or actions in response to the programming instructions 802 conveyed to the computing device 700 by one or more of the computer readable medium 803, the computer recordable medium 804, and/or the communications medium 805.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims, along with the full scope of equivalents to which such claims are entitled. It is also to be understood that the terminology used herein is for the purpose of describing particular embodiments only, and is not intended to be limiting.

What is claimed is:

1. In a computing system, a method for providing scroll-wheel functionality on a touchpad, the method comprising:
   receiving data corresponding to angular movement of a touch point on the touchpad;
   determining from the received data that the angular movement is substantially elliptical, wherein the angular movement defines an ellipse around an ellipse center;
   in response to the angular movement that is substantially elliptical:
      defining, on the touchpad, an elliptical path corresponding to the ellipse; and activating scroll-wheel functionality on the elliptical path; and while the scroll-wheel functionality is activated on the elliptical path, detecting, based on the received data, continued angular movement of the touch point around the ellipse center, and registering the continued angular movement as one or more scroll events in the computing system, wherein registering the continued angular movement comprises:

determining that an angle defined by the continued angular movement is equal to or greater than an angular threshold, wherein changing in a first direction a speed of the continued angular movement causes the angular threshold to change in an opposite second direction; and changing a display on a display screen in accordance with the determined angle.

2. The method of claim 1, wherein the ellipse comprises a non-circular ellipse.

3. The method of claim 1, wherein the touchpad is substantially rectangular.

4. The method of claim 1, wherein the touchpad is a touch-sensitive display screen, and wherein registering the continued angular movement as one or more scroll events comprises changing a display on the touch-sensitive display screen in accordance with each of the one or more scroll events.

5. The method of claim 4, wherein changing the display comprises traversing a graphical image associated with the display.

6. The method of claim 4, wherein the angular threshold is about 60 degrees.

7. The method of claim 4, further comprising:
decreasing the angular threshold in response to detecting an increase in a speed of the determined angular movement.

8. The method of claim 4, further comprising:
increasing the angular threshold in response to detecting a decrease in a speed of the determined angular movement.

9. The method of claim 1, further comprising:
increasing a scrolling speed of the one or more scroll events upon determination that a distance between the ellipse center and the touch point is decreasing.

10. The method of claim 1, further comprising:
decreasing a scrolling speed of the one or more scroll events upon determination that a distance between the ellipse center and the touch point is increasing.

11. The method of claim 1, further comprising:
based on the received data, redefining the ellipse center while detecting continued angular movement of the touch point, so as to account for shifting of the ellipse on the touchpad.

12. The method of claim 11, further comprising:
redefining a size of the ellipse to facilitate continued detection of the angular movement of the touch point.

13. The method of claim 1, wherein determining from the received data that the angular movement is substantially elliptical comprises:
determining coordinates of a plurality of consecutive positions of the touch point on the touchpad; and
determining, based on the determined coordinates, the ellipse and the ellipse center.

14. The method of claim 1, wherein the computing system performing the method comprises a head-mountable display (HMD) device, and wherein the touchpad is arranged on the HMD device such that the touchpad is located along a temple when the HMD device is worn.

15. The method of claim 1, further comprising:
deactivating the scroll-wheel functionality in response to detecting the removal of the touch point from the touchpad.

16. A computing system, comprising:
a display device configured to display graphical images;
a touchpad positioned on the display device, and configured to generate a signal indicative of an angular movement of a touch point on the touchpad;
a memory unit storing a program instructions executable to perform functions for providing scroll-wheel functionality on a touchpad, the functions comprising:
(a) receiving data corresponding to the angular movement of the touch point on the touchpad,
(b) determining from the received data that the angular movement is substantially elliptical, wherein the angular movement defines an ellipse around an ellipse center,
(c) in response to the angular movement that is substantially elliptical:
(i) defining, on the touchpad, an elliptical path corresponding to the ellipse, and
(ii) activating scroll-wheel functionality on the elliptical path; and
(d) while the scroll-wheel functionality is activated on the elliptical path, detecting, based on the received data, continued angular movement of the touch point around the ellipse center, and registering the continued angular movement as one or more scroll events in the computing system, wherein registering the continued angular movement comprises:
(i) determining that an angle defined by the continued angular movement is equal to or greater than an angular threshold, wherein changing in a first direction a speed of the continued angular movement causes the angular threshold to change in an opposite second direction; and
(ii) changing a display on the display device in accordance with the determined angle; and
a processor unit operatively coupled to the memory unit, the touchpad, and the display device, and configured to execute the program instructions.

17. The computing system of claim 16, wherein the ellipse comprises a non-circular ellipse.

18. The computing system of claim 16, wherein the touchpad is substantially rectangular.

19. The computing system of claim 16, wherein the method step of registering the continued angular movement as one or more scroll events further comprises:
changing the displayed graphical images in accordance with each of the one or more scroll events.

20. A non-transitory computer readable storage medium containing instructions that cause a computing system to perform functions for providing scroll-wheel functionality on a touchpad without the touchpad predefining a scroll-wheel, the functions comprising:
receiving data corresponding to angular movement of a touch point on the touchpad;
determining from the received data that the angular movement is substantially elliptical, wherein the angular movement defines an ellipse around an ellipse center;
in response to the angular movement that is substantially elliptical:
defining, on the touchpad, an elliptical path corresponding to the ellipse; and
activating scroll-wheel functionality on the elliptical path; and while the scroll-wheel functionality is activated on the elliptical path, detecting, based on the received data, continued angular movement of the touch point around the ellipse center, and registering the continued angular movement as one or more scroll events in the computing system, wherein registering the continued angular movement comprises:

determining that an angle defined by the continued angular movement is equal to or greater than an angular threshold, wherein changing in a first direction a speed of the continued angular movement causes the angular threshold to change in an opposite second direction; and changing a display on a display screen in accordance with the determined angle.

21. The non-transitory computer readable storage medium of claim 20, wherein the ellipse comprises a non-circular ellipse.

22. A head-wearable display device comprising:

a display element for displaying graphical images;

an image projecting unit for projecting the graphical images on the display element;

a touchpad configured to generate a signal indicative of an angular movement of a touch point on the touchpad, wherein the touchpad is outside a field of vision of a user while wearing the head-wearable display device;

a memory unit storing program instructions that are executable to provide functions for providing scroll-wheel functionality on the touchpad, the functions comprising: (a) receiving data corresponding to the angular movement of the touch point on the touchpad, (b) determining from the received data that the angular movement is substantially elliptical, wherein the angular movement defines an ellipse around an ellipse center, (c) in response to the angular movement that is substantially elliptical: (i) defining, on the touchpad, an elliptical path corresponding to the ellipse, and (ii) activating scroll-wheel functionality on the elliptical path, (d) while the scroll-wheel functionality is activated on the elliptical path, detecting, based on the received data, continued angular movement of the touch point around the ellipse center, registering the continued angular movement as one or more scroll events in the computing system, wherein registering the continued angular movement comprises: (i) determining that an angle defined by the continued angular movement is equal to or greater than an angular threshold, wherein changing in a first direction a speed of the continued angular movement causes the angular threshold to change in an opposite second direction, and (ii) changing a display on the display device in accordance with the determined angle, and (e) traversing one of the projected graphical images in accordance with each of the one or more scroll events; and a processor operatively coupled to the memory, the touchpad, and the image projecting unit, and configured to execute the method.

23. The head wearable display device of claim 22, wherein the display element comprises a lens of a pair of glasses, and the graphical images are displayed on an inside-surface of the lens.

24. The head wearable display device of claim 23, wherein the image projecting display unit is coupled to an inside surface of a stem or temple of the pair of glasses.

25. The head wearable display device of claim 24, wherein the touchpad is affixed to an outside surface of the temple.

26. The head wearable display device of claim 24, wherein the touchpad is incorporated into or integral to the temple.

\* \* \* \* \*